United States Patent
Kuros (10) Patent No.: US 10,316,959 B2
(45) Date of Patent: Jun. 11, 2019

(54) SYSTEM AND METHOD FOR CONTROLLING A WORK VEHICLE TRANSMISSION BASED ON THE DETECTION OF UNINTENDED VEHICLE MOTION

(71) Applicant: CNH Industrial America, LLC, New Holland, PA (US)

(72) Inventor: Pawel Kuros, Wood Dale, IL (US)

(73) Assignee: CNH Industrial America LLC, New Holland, PA (US)

( * ) Notice: Subject to any disclaimer, the term of this patent is extended or adjusted under 35 U.S.C. 154(b) by 75 days.

(21) Appl. No.: 15/010,181

(22) Filed: Jan. 29, 2016

(65) Prior Publication Data

US 2017/0219092 A1    Aug. 3, 2017

(51) Int. Cl.
*F16H 59/48* (2006.01)
*F16H 59/66* (2006.01)
(Continued)

(52) U.S. Cl.
CPC ... *F16H 61/0204* (2013.01); *B60W 30/18054* (2013.01); *B60Y 2200/22* (2013.01); *B60Y 2200/221* (2013.01); *F16H 47/04* (2013.01); *F16H 59/48* (2013.01); *F16H 2059/443* (2013.01); *F16H 2059/663* (2013.01)

(58) Field of Classification Search
CPC ...... F16H 61/0204; F16H 59/48; F16H 59/66; F16H 2059/443; F16H 2059/663; B60W 30/18054; B60Y 2200/22
See application file for complete search history.

(56) References Cited

U.S. PATENT DOCUMENTS 4,084,670 A    4/1978 Morishita
5,020,645 A    6/1991 Sasa
(Continued)

FOREIGN PATENT DOCUMENTS

WO    WO 2011/112138    9/2011

OTHER PUBLICATIONS

Tri-Axis, User Selectable 2g, 4g, 8g Digital (12C) Output, Dated Jan. 18, 2016, (3 pages) Website: www.kionix.com.
(Continued)

*Primary Examiner* — Alan D Hutchinson
(74) *Attorney, Agent, or Firm* — Rickard K. DeMille; Rebecca L. Henkel (57) ABSTRACT

A method for controlling the operation of a transmission of a work vehicle based on the detection of unintended vehicle motion may generally include determining an intended driving direction for the work vehicle while the vehicle is positioned on a sloped surface and initiating a shifting procedure within the transmission for engaging an on-coming clutch associated with moving the work vehicle in the intended driving direction, wherein the on-coming clutch is initially engaged at an initial ramp rate. In addition, the method may include monitoring an acceleration of the work vehicle as the on-coming clutch is being engaged, determining a current travel direction for the work vehicle based on the monitored acceleration and, when the current travel direction differs from the intended driving direction, adjusting the initial ramp rate for engaging the on-coming clutch to an increased ramp rate.

15 Claims, 5 Drawing Sheets

(51) Int. Cl.
*F16H 61/02* (2006.01)
*F16H 59/44* (2006.01)
*B60W 30/18* (2012.01)
*F16H 47/04* (2006.01)

(56) References Cited

U.S. PATENT DOCUMENTS

| | | | |
|---|---|---|---|
| 5,549,525 A | | 8/1996 | Wendel |
| 5,788,040 A | * | 8/1998 | Moorman ............... F16D 48/06 192/103 C |
| 7,041,031 B2 | | 5/2006 | Wheeler et al. |
| 7,136,735 B2 | | 11/2006 | Carlson et al. |
| 7,226,389 B2 | | 6/2007 | Steen et al. |
| 7,463,953 B1 | | 12/2008 | Lee et al. |
| 8,078,378 B2 | | 12/2011 | Bradley, IV |
| 8,239,107 B2 | | 8/2012 | Mair |
| 8,352,126 B2 | | 1/2013 | Blaise et al. |
| 8,401,753 B2 | | 3/2013 | Chappell et al. |
| 8,412,436 B2 | | 4/2013 | Mallet et al. |
| 8,543,303 B2 | | 9/2013 | Marcus |
| 8,589,015 B2 | | 11/2013 | Willis et al. |
| 8,630,768 B2 | | 1/2014 | McClellan et al. |
| 8,761,980 B2 | | 6/2014 | Kimoto |
| 9,005,082 B2 | | 4/2015 | Okamura et al. |
| 9,007,220 B2 | | 4/2015 | Johns et al. |
| 2007/0299581 A1 | | 12/2007 | Torralbo et al. |
| 2008/0091343 A1 | | 4/2008 | Hill et al. |
| 2010/0017070 A1 | | 1/2010 | Doering et al. |
| 2010/0191408 A1 | | 7/2010 | Boylston et al. |
| 2012/0209502 A1 | | 8/2012 | Nichols et al. |
| 2013/0304340 A1 | | 11/2013 | Shattuck et al. |
| 2015/0117938 A1 | | 4/2015 | Flatley et al. |
| 2015/0120143 A1 | | 4/2015 | Schlichting |
| 2015/0120158 A1 | * | 4/2015 | Vande Haar ............ F16H 61/16 701/65 |

OTHER PUBLICATIONS

SparkFun Triple Axis Accelerometer Breakout—ADXL335, Dated Jan. 18, 2016 (4 pages) Website: www.sparkfun.com.

Startup Control Method Hilling Startup Control Method Using Accelerometer, Dated Jan. 29, 2016 (3 pages) http://ieeexplore.ieee.org.

* cited by examiner

SYSTEM AND METHOD FOR CONTROLLING A WORK VEHICLE TRANSMISSION BASED ON THE DETECTION OF UNINTENDED VEHICLE MOTION

FIELD OF THE INVENTION

The present subject matter relates generally to work vehicles and, more particularly, to a system and method for controlling the operation of a transmission of a work vehicle based on the detection of unintended vehicle motion, such as unintended rollback occurring when the work vehicle is parked on a slope and is attempting to take-off from such parked condition.

BACKGROUND OF THE INVENTION

Work vehicles, such as tractors and other agricultural vehicles, typically include an engine and a transmission, such as a power shift transmission (PST) or a continuously variable transmission (CVT), coupled to the engine. The engine and the transmission are often controlled by one or more electronic controller(s). For example, a transmission controller may be used to control the fluid pressure of the hydraulic fluid supplied to the various clutch actuators associated with the transmission clutches, which, in turn, controls the engagement and/or disengagement of the clutches.

When the transmission is fully engaged, the travel direction of the associated work vehicle may be deduced by determining which of the transmission clutches are engaged (i.e., based on the current clutch pattern for the transmission). However, when the transmission is not fully engaged (e.g., when shifting from park to the forward or reverse direction), conventional transmission controllers are not capable of determining the current travel direction of the work vehicle. As such, when a work vehicle is parked on the side of a hill or inclined surface and the operator commands that the vehicle be moved up the inclined surface, the transmission controller is not able to detect instances of the vehicle rolling back down the inclined surface as the transmission is being shifted. Accordingly, conventional work vehicles often experience undesirable "rollback" events when operating on an inclined surface.

Additionally, to detect the direction of travel of a work vehicle, more recent transmissions have been equipped with a bi-directional speed sensor. However, bi-directional speed sensors are typically quite expensive and, thus, their use within a work vehicle transmission is often undesirable.

Accordingly, an improved, cost-effective system and method for controlling the operation of a work vehicle transmission based on the detection of unintended vehicle motion, such as unintended rollback, would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling the operation of a transmission of a work vehicle based on the detection of unintended vehicle motion. The method may generally include determining an intended driving direction for the work vehicle while the work vehicle is positioned on a sloped surface and initiating a shifting procedure within the transmission for engaging an on-coming clutch associated with moving the work vehicle in the intended driving direction, wherein the on-coming clutch is initially engaged at an initial ramp rate. In addition, the method may include monitoring an acceleration of the work vehicle as the on-coming clutch is being engaged, determining a current travel direction for the work vehicle based on the monitored acceleration and, when the current travel direction corresponds to an opposite direction than the intended driving direction, adjusting the initial ramp rate for engaging the on-coming clutch to an increased ramp rate.

In another aspect, the present subject matter is directed to a system for controlling the operation of a transmission of a work vehicle based on the detection of unintended vehicle motion when the work vehicle is initially parked on a sloped surface. The system may include an accelerometer located on or within the work vehicle and a controller communicatively coupled to the accelerometer. The controller may include a processor and associated memory. The memory may store instructions that, when implemented by the processor, configure the controller to determine an intended driving direction for the work vehicle and initiate a shifting procedure within the transmission for engaging an on-coming clutch associated with moving the work vehicle in the intended driving direction, wherein the on-coming clutch is initially engaged at an initial ramp rate. In addition, the controller may be configured to monitor an acceleration of the work vehicle as the on-coming clutch is being engaged based on sensor measurements received from the accelerometer, determine a current travel direction for the work vehicle based on the monitored acceleration and, when the current travel direction differs from the intended driving direction, adjust the initial ramp rate for engaging the on-coming clutch to an increased ramp rate.

In a further aspect, the present subject matter is directed to a work vehicle including a chassis, an engine supported on the chassis, a transmission coupled to the engine and a controller communicatively coupled to the transmission. The controller may include a processor and associated memory. The memory may store instructions that, when implemented by the processor, configure the controller to determine an intended driving direction for the work vehicle and initiate a shifting procedure within the transmission for engaging an on-coming clutch associated with moving the work vehicle in the intended driving direction, wherein the on-coming clutch is initially engaged at an initial ramp rate. In addition, the controller may be configured to monitor an acceleration of the work vehicle as the on-coming clutch is being engaged, determine a current travel direction for the work vehicle based on the monitored acceleration and, when the current travel direction differs from the intended driving direction, adjust the initial ramp rate for engaging the on-coming clutch to an increased ramp rate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3 illustrates a schematic view of one embodiment of a suitable clutch configuration that may be used with the clutches of the transmission shown in FIG. 2;

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling a transmission of a work vehicle based on the detection of unintended vehicle motion. Specifically, in several embodiments, the disclosed system may include at least one accelerometer mounted on and/or within the work vehicle that is configured to detect motion of the vehicle. The accelerometer(s) may, in turn, be communicatively coupled to an electronic controller configured to control the operation of the transmission, such as the engagement and/or disengagement of the transmission clutches. As a result, the controller may monitor the current travel direction of the work vehicle. In the event that the current travel direction differs from the desired or intended travel direction for the work vehicle, the controller may adjust the operation of the transmission in an attempt to prevent or minimize further motion of the vehicle in the unintended direction. For instance, when the work vehicle is parked on the side of a hill or inclined surface and the operator commands that the vehicle be moved up the inclined surface, the controller may be configured to detect rollback of the vehicle as the transmission is being shifted from a parked condition to a driving condition. In such instance, the controller may be configured to increase the ramp rate for engaging the on-coming transmission clutch(es) to prevent or minimize further rollback of the vehicle.

As should be apparent from the description below, the use of the disclosed accelerometer(s) provides a simple, cost-effective means for detecting unintended vehicle motion. For example, accelerometers are typically significantly less expensive than bi-directional speed sensors.

Figure 1:
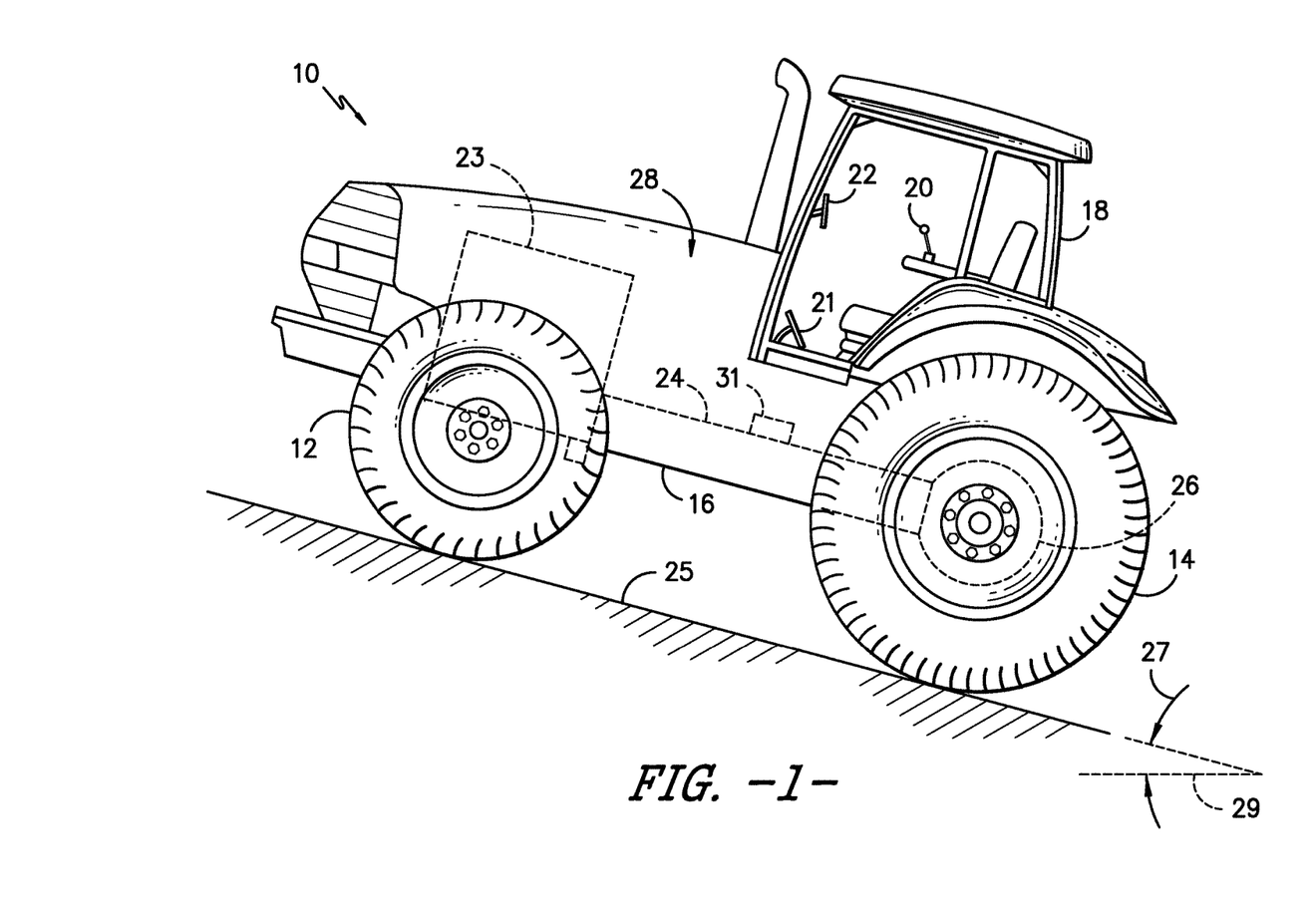
FIG. 1 illustrates a side view of one embodiment of a work vehicle.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control or input devices 20, 21, 22 (e.g., levers, pedals, control panels, buttons and/or the like) for permitting an operator to control the operation of the work vehicle 10. For instance, as shown in FIG. 1, the work vehicle 10 may include a Forward-Neutral-Reverse-Park (FNRP) lever 20 and a clutch pedal 21. In addition, the work vehicle 10 may include a display panel 22 for displaying message windows and/or alerts to the operator and/or for allowing the operator to interface with the vehicle's controller. For instance, in one embodiment, the display panel 22 may include a touch screen and/or associated buttons or other input devices that allow the operator to provide user inputs to the controller.

Moreover, the work vehicle 10 may include an engine 23 and a transmission 24 mounted on the chassis 16. The transmission 24 may be operably coupled to the engine 23 and may provide variably adjusted gear ratios for transferring engine power to the wheels 14 via an axle/differential 26. The engine 23, transmission 24, and axle/differential 26 may collectively define a drivetrain 28 of the work vehicle 10.

As shown in FIG. 1, the work vehicle 10 may often be parked on a hill or other sloped surface 25. In such instance, when shifting the vehicle 10 from a parked condition to a driving condition in which the vehicle 10 is intended to travel up the sloped surface 25, the work vehicle 10 may initially roll in the opposite direction down the slope due to the delay in engaging the transmission clutch(es) associated with moving the vehicle 10 in its intended travel direction. For instance, with the vehicle orientation shown in FIG. 1 in which the work vehicle 10 is facing up the sloped surface 25, the work vehicle 10 may initially roll backwards down the sloped surface 25 in a reverse direction when it is attempted to shift the transmission 24 from parked to driving in the forward direction up the sloped surface 25. Similarly, with the opposite vehicle orientation in which the work vehicle 10 is facing down the sloped surface 25, the work vehicle 10 may initially roll down the sloped surface 25 in the forward direction when it is attempted to shift the transmission 24 from parked to driving in the reverse direction up the sloped surface 25. It should be appreciated that, as used herein, the term "sloped surface" is used to describe a driving surface extending at a non-zero angle 27 relative to a horizontal reference plane 29 (i.e., a reference plane extending perpendicular to the direction of gravity acting on the work vehicle 10).

To detect when the vehicle 10 is traveling in the opposite direction of the intended travel direction when taking off from a sloped surface 25, the work vehicle 10 may, in several embodiments, include one or more accelerometers 31. Specifically, as will be described below, based on the measurement signals provided by the accelerometer(s) 31, the current direction of travel of the work vehicle 10 may be determined. In the event that the current direction of travel differs from the intended travel direction (e.g., due to the work vehicle 10 rolling down the slope surface 25), a suitable corrective action may be performed to prevent or minimize further travel of the work vehicle 10 in the unintended travel direction, such as by increasing the ramp rate of the clutch pressure associated with on-coming clutch(es) within the transmission 24.

It should be appreciated that the accelerometer(s) 31 may generally correspond to any suitable type of accelerometer. However, in several embodiments, the accelerometer(s) 31 may correspond to one or more multi-axis accelerometers (e.g., one or more two-axis or three-axis accelerometers). In such embodiments, the accelerometer(s) 31 may be configured to monitor the acceleration of the vehicle 10 in multiple directions, such as by sensing the vehicle acceleration along three different axes.

It should also be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration 10. For example, in an alternative embodiment, a separate frame or chassis may be provided to which the engine 23, transmission 24, and differential 26 are coupled, a configuration common in smaller tractors. Still other configurations may use an articulated chassis to steer the work vehicle 10, or rely on tracks in lieu of the wheels 12, 14. Additionally, although not shown, the work vehicle 10 may also be configured to be operably coupled to any suitable type of work implement, such as a trailer, spray boom, manure tank, feed grinder, plow and/or the like.

Figure 2:
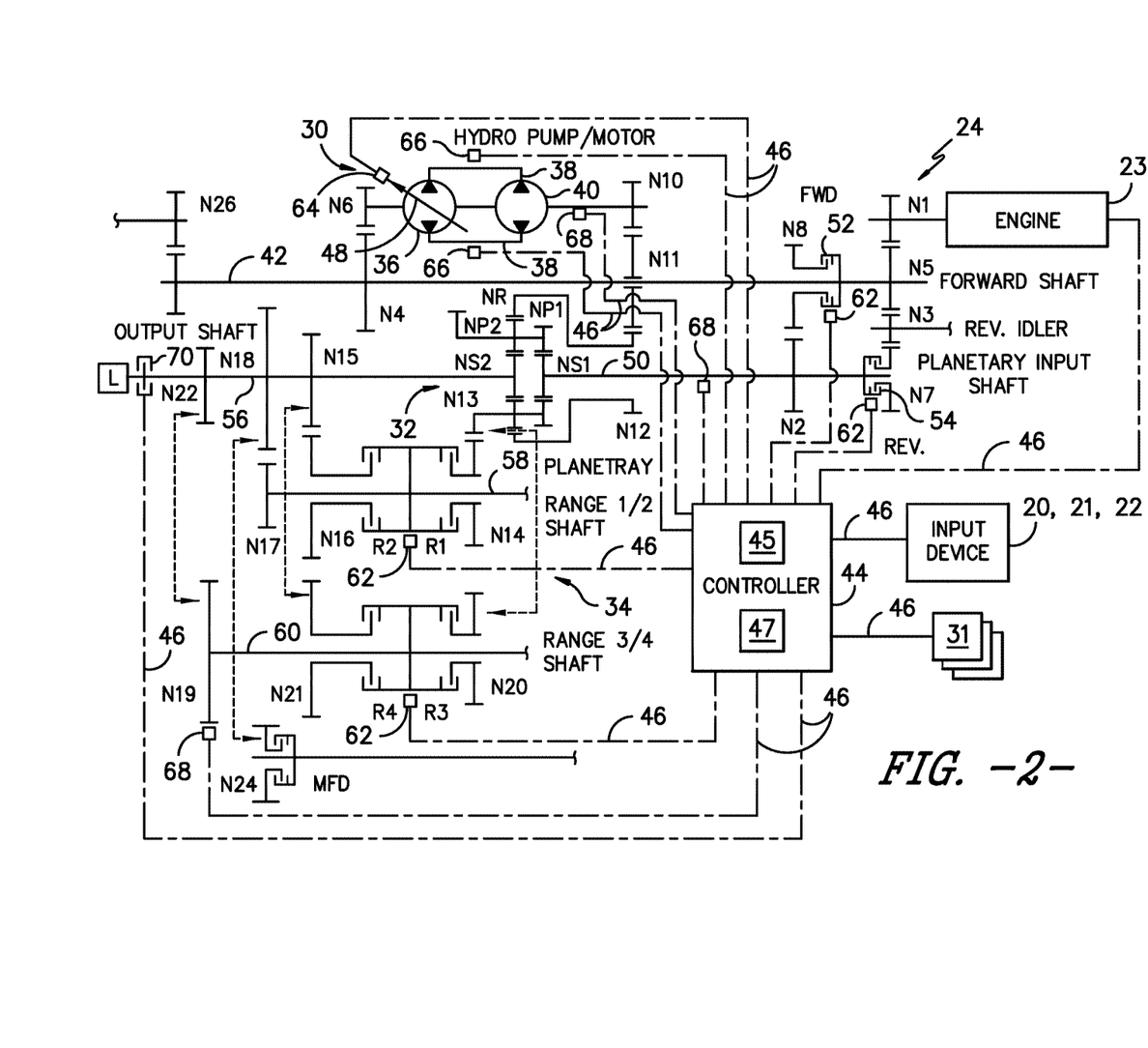
FIG. 2 illustrates a schematic view of one embodiment of a transmission suitable for use within the work vehicle shown in FIG. 1.

Referring now to FIG. 2, a schematic diagram of one embodiment of a transmission 24 suitable for use with the work vehicle 10 described above is illustrated in accordance with aspects of the present subject matter. As shown, the transmission 24 may include a hydrostatic power unit 30 and a planetary power unit 32. The hydrostatic power unit 30 and the planetary power unit 32 may be coupled to a driveline including a range gear set 34 and may also be coupled to a load L. For example, in one embodiment, the load L may correspond to the drive wheels of the work vehicle 10 (e.g., the front and/or rear wheels 12, 14 of the work vehicle 10). Alternatively, the hydrostatic power unit 30 and the planetary power unit 32 may be coupled to any other suitable load L, such as loads that include a track drive or a separate operating system of the work vehicle 10.

The hydrostatic power unit 30 of the transmission 10 may generally include a fluid pump 36 coupled by fluid conduits 38 in a closed loop to a fluid motor 40. The motor 40 may be coupled to the engine 23 via an input gear N6. Specifically, as shown in FIG. 2, power may be transmitted to the hydrostatic power unit 30 by a driven gear N4 mounted on a forward shaft 42 of the transmission 10 and engaged with the input gear N6. In addition, an output gear N10 for the hydrostatic power unit 30 may be connected to a ring gear NR of the planetary power unit 32 via gears N11 and N12. A power take off (PTO) of the vehicle 10 may also be coupled to the engine 23 through the forward shaft 42 (e.g., by coupling a PTO gear reduction N26 to the forward shaft 42, which is coupled to the engine 23 via gears N5 and N1).

In general, the pump 36 may comprise any suitable electronically controlled pump known in the art, such as an electronically controlled variable displacement hydraulic pump. As such, operation of the pump 36 may be automatically controlled using an electronic controller 44 of the work machine 10. For example, as shown in FIG. 2, the controller 44 may be communicatively coupled to the pump 36 via a suitable communicative link 46 so that the angle of a swash plate of the pump 36 (the swash plate being denoted by a diagonal arrow 48 through pump 36) may be adjusted through a range of positions, thereby adjusting the transmission ratio of the transmission 24.

It should be appreciated the controller 44 may generally comprise any suitable processor-based device known in the art. Thus, in several embodiments, the controller 44 may include one or more processor(s) 45 and associated memory device(s) 47 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 47 of the controller 44 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 47 may generally be configured to store suitable computer-readable instructions that, when implemented by the processor(s) 45, configure the controller 44 to perform various computer-implemented functions, such as the method 200 described below with reference to FIG. 4. In addition, the controller 44 may also include various other suitable components, such as a communications circuit or module, one or more input/output channels, a data/control bus and/or the like.

Referring still to FIG. 2, the planetary power unit 32 of the transmission 24 may generally include a primary sun gear NS1 mounted on a planetary input shaft 50. As shown, the planetary input shaft 50 may be coupled to the engine 23 via a forward directional clutch 52 or a reverse directional clutch 54. In addition, the planetary power unit 32 may be configured to be selectively coupled to the load L, coupled to the hydrostatic power unit 30 and selectively coupled to the engine 23, all under automatic control of the controller 44. For example, for coupling the planetary power unit 32 to the load L, the transmission 24 may include an output shaft 56 coupled to the load L which carries an input gear N18 engaged with an output gear N17 on a range ½ shaft 58 of the range gear set 34 and a gear N22 engaged with a gear N19 on a range ¾ shaft 60 of the range gear set 34. The range 1/2 shaft 58 may, in turn, be coupled to the planetary power unit 32 via automatic operation of range selectors or clutches R1 and R2 for power flow through gears N13 and N14, or N15 and N16, respectively. Similarly, the range ¾ shaft 60 may be coupled to the planetary power unit 32 via range selectors or clutches R3 and R4 for power flow via gears N13 and N20, or N15 and N21, respectively. The range ½ and ¾ shafts 58, 60 may also be simultaneously coupled to the planetary power unit 32 to provide dual power flow. It should be appreciated that operation of the various clutches (e.g., the forward directional clutch 52, the reverse directional clutch 54, and clutches R1, R2, R3 and R4) may be automatically controlled by the controller 44 using suitable actuators 62 (e.g., hydraulic pistons), as will be described below with reference to FIG. 3.

The controller 44 may also be communicatively coupled to a swash plate actuator 64 for automatically controlling the position or angle of the swash plate 48 of the pump 36. For example, the actuator 64 may be configured to move the swash plate 48 across a range of angles in response to control signals (e.g., current commands) received from the controller 44. In addition, the controller 44 may be coupled to any number of sensors for monitoring the various operating parameters of the transmission 24 including, but not limited to, pressure transducers or sensors 66 for sensing the pressure within the conduits 38 connecting the pump 36 to the motor 40 and/or for sensing the pressure of the hydraulic fluid within the various clutches of the transmission 24, speed sensors 68 for sensing speeds of the various shafts of the transmission 24 (e.g., by sensing the motor speed of the fluid motor 40), temperature sensors for sensing the temperature of one or more fluids within the transmission 24 and/or any other suitable sensors. Similarly, the controller 44 may also be connected to the engine 23 (e.g., a speed governor of the engine 23) for receiving engine speed data and other information therefrom.

Additionally, as shown in FIG. 2, the controller 44 may also be communicatively coupled to the accelerometer(s) 31 included on and/or within the work vehicle 10 via a suitable communicative link(s) 46. As indicated above, the measurement signal(s) provided by such accelerometer(s) 31 may allow the controller 44 to determine the current travel direction of the work vehicle 10. Moreover, the controller 44 may be communicatively coupled to the operator-controlled input device(s) 20, 21, 22 positioned within the cab 18 via a suitable communicative link(s) 46. For example, the controller 44 may be coupled to the FRNP lever 20, the clutch pedal 21, the display panel 22 and/or any other suitable input device of the vehicle 10 (e.g., the speed control lever or pedal, the engine throttle lever, the neutral button and/or any other suitable lever, pedal, button or control panel of the vehicle 10).

During operation, the transmission 24 may be operated to have a combined hydrostatic and mechanical power flow by engaging the reverse directional clutch 54 to the power planetary power unit 32 via gears N1, N3, N5 and N7, or engaging the forward directional clutch 52 to power the power planetary power unit 32 via gears N1, N8, and N2. Alternatively, the transmission 44 may be operated to have a pure hydrostatic power flow by disengaging both of the directional clutches 52, 54. Regardless, the transmission 24 may provide a seamless transition between ranges to provide work/road configurations as desired. In particular, speed changes from zero to the maximum speed within each speed range of the transmission 24 may be achieved in a smooth and continuous manner by automatically changing the swash plate angle of the pump 36 via control signals transmitted from the controller 44. For each speed range, substantially the full range of travel of the swash plate may be used. For example, in several embodiments, the swash plate may be at one end of its range of travel for zero speed within a specific speed range, may be at the other end of its range of travel for the maximum speed of that speed range and may be at a zero tilt or neutral position within its range of travel for an intermediate speed of that same speed range.

Referring still to FIG. 2, the transmission 24 may also include a parking brake 70 operably positioned on the load shaft 56. In several embodiments, the parking brake 70 may be communicatively coupled to the controller 44 (via a suitable communicative link 46) for automatic control thereof. For example, the controller 44 may be configured to proportionally or gradually engage the parking brake 70 as well as gradually release or disengage the parking brake 70. In such embodiments, the pressure of the hydraulic fluid supplied to the parking brake 70 may be controlled using an automatic valve (e.g., a proportional pressure reducing valve) configured to be operated via control signals transmitted from the controller 44. As is generally understood, the parking brake pressure may be inversely related to the parking brake torque. Thus, contrary to the various clutches of the transmission 24, the parking brake 70 may be designed such that it is engaged when the pressure within the brake 70 is reduced and disengaged when the pressure within the brake 70 is increased.

It should be appreciated that the configuration of the transmission 24 shown in FIG. 2 simply illustrates one example of a suitable transmission with which the disclosed system and method may be utilized. Thus, one of ordinary skill in the art should appreciate that application of the present subject matter need not be limited to the particular CVT configuration shown in FIG. 2, but, rather, the present subject matter may be advantageously used with various different transmission configurations, including other CVT configurations and suitable PST configurations.

Figure 3:
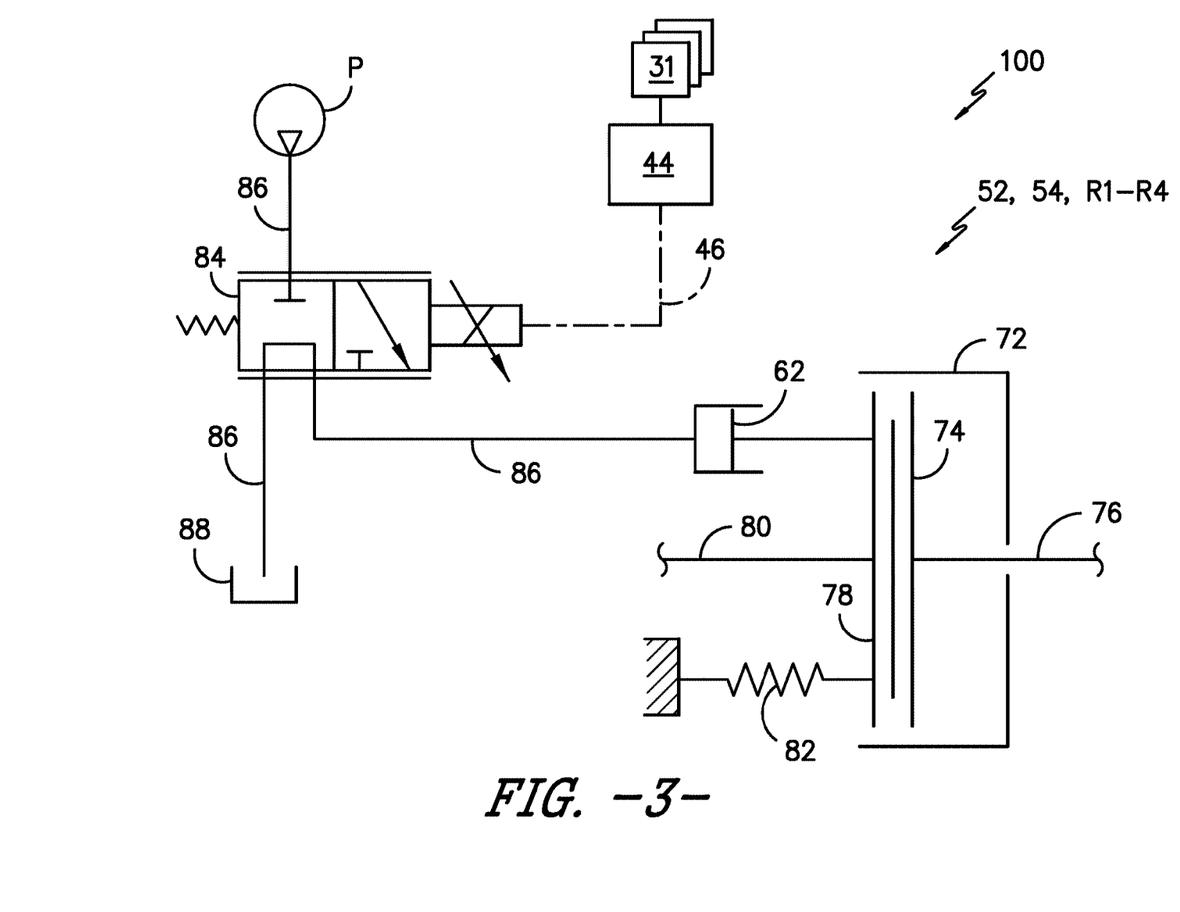
FIG. 3 illustrates a schematic view of one embodiment of a system for controlling a transmission of a work vehicle based on the detection of unintended vehicle motion in accordance with aspects of the present subject matter. In addition.

Referring now to FIG. 3, a schematic diagram of one embodiment of a hydraulically operated clutch is illustrated in accordance with aspects of the present subject matter. The clutch is generally representative of a suitable configuration for the directional clutches 52 and 54, and the range clutches R1-R4 of the transmission 24 described above with reference to FIG. 2.

As shown, the hydraulically operated clutch may include an enclosure or can 72 that contains one or more clutch plates 74 coupled to an output shaft 76 and one or more clutch plates 78 coupled to an input shaft 80. In addition, the clutch may include both a clutch spring(s) 82 configured to hold the clutch plates 74, 78 apart and a fluid operated clutch actuator (e.g., actuator 62 described above with reference to FIG. 2) configured to press the clutch plates 74, 78 together to engage the clutch.

Moreover, as shown in FIG. 3, pressurized fluid may be supplied to the clutch actuator 62 by a proportional solenoid pressure reducing valve 84 (e.g., via fluid lines 86). The valve 84 may be configured to receive the pressurized fluid from a pump P of the vehicle 10 and may also be in fluid communication with a fluid tank 88 of the vehicle 10. As is generally understood, operation of the valve 84 may be automatically controlled by the controller 44 through the transmission of suitable control signals via the communicative link(s) 46. Each control signal may generally correspond to a current command associated with a specific electrical current value, which, in turn, may be directly proportional to the pressure of the hydraulic fluid supplied to the clutch actuator 62 from the valve 84. Thus, by varying the current command, the controller 44 may directly control the fluid pressure of the hydraulic fluid supplied to the clutch actuator 62 and, thus, control engagement/disengagement of the clutch.

It should be appreciated that FIG. 3 also illustrates a schematic view of one embodiment of a system 100 for controlling the operation of a transmission of a work vehicle based on the detection of unintended vehicle motion in accordance with aspects of the present subject matter. Specifically, in several embodiments, the system 100 may include the controller 24, the accelerometer(s) 31 and any suitable combination of the various components of the transmission 24 (e.g., one or more of the transmission components shown in FIG. 2 and/or FIG. 3). In such embodiments, the controller 44 may be configured to adjust the ramp rate of the clutch pressure for engaging one or more of the transmission clutches based on the measurements signals received from the accelerometer(s) 31. As a result, when it is detected that the work vehicle 10 is traveling in an unintended travel direction (e.g., due to the vehicle 10 rolling down a sloped surface 25), the system 100 may be used to adjust the manner in which the clutch(es) are being engaged to prevent or minimize further motion of the vehicle 10 in the unintended travel direction.

Figure 4:
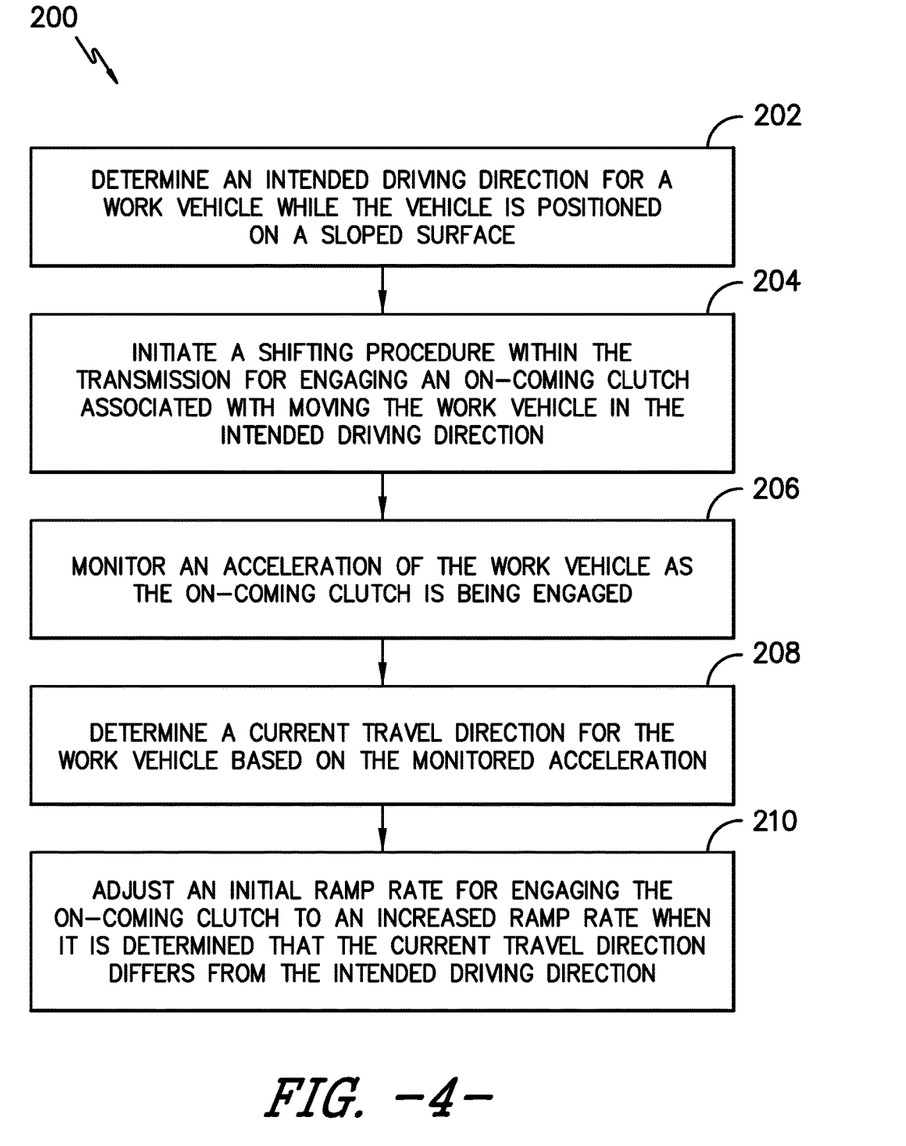
FIG. 4 illustrates a flow diagram of one embodiment of a method for controlling a transmission of a work vehicle based on the detection of unintended vehicle motion in accordance with aspects of the present subject matter.

Referring now to FIG. 4, one embodiment of a method 200 for controlling the operation of a transmission of a work vehicle based on the detection of unintended vehicle motion is illustrated in accordance with aspects of the present subject matter. In general, the method 200 will be described with reference to the transmission 24 described above with reference to FIGS. 2 and 3, as well as the system 100 described above with reference to FIG. 3. However, it should be appreciated by those of ordinary skill in the art that the disclosed method 200 may generally be utilized with any other suitable transmission configuration and/or any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include determining an intended driving direction for a work vehicle while the vehicle is positioned on a sloped surface. For instance, as indicated above, the controller 44 may be communicatively coupled to one or more input devices for receiving operator inputs. In such an embodiment, the controller 44 may be configured to determine the intended driving direction for the work vehicle 10 based on the operator input(s) received from the input device(s). For example, if the FNRP lever 20 is moved to from the "park" position to either the "forward" position or the "reverse" position, the controller 44 may determine that the intended travel direction corresponds to the forward direction or the reverse direction, respectively.

Figure 5:
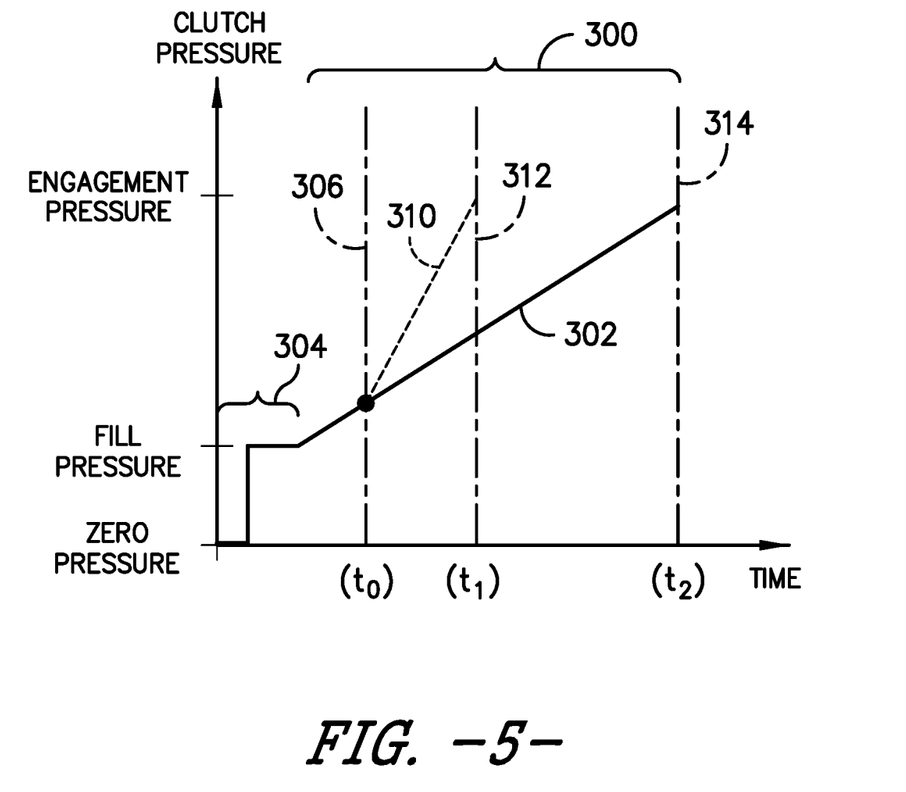
FIG. 5 illustrates a simplified graph providing an example of how clutch pressure may be changed over time when a transmission clutch is switched from a disengaged state to an engaged state, particularly illustrating the ramp rate for the clutch pressure being increased when unintended vehicle motion is detected in accordance with aspects of the present subject matter.

Additionally, at (204), the method 200 may include initiating a shifting procedure within the transmission for engaging an on-coming clutch associated with moving the work vehicle in the intended driving direction. Specifically, when an operator input is received indicating that the work vehicle 10 should be shifted from its parked condition to a driving condition, the controller 44 may be configured to control the operation of the transmission 24 such that the appropriate clutch(es) is subsequently engaged for moving the work vehicle 10 in the requested driving direction. As is generally understood, the on-coming clutch(es) is typically engaged by ramping up its clutch pressure at a predetermined ramp rate. For example, FIG. 5 illustrates a simplified graph illustrating the change in clutch pressure over time for engaging an on-coming clutch. As shown, when engaging the on-coming clutch, the clutch pressure may be increased from a reduced pressure to an engagement pressure during a ramp phase 300 where the current command is ramped up at a given ramp rate (indicated by solid line 302) to ensure that clutch engagement is achieved in a controlled manner. Additionally, as shown, the shifting procedure may also include a quick-fill phase 304 during which the clutch is automatically quick-filled to a given fill pressure prior to the clutch pressure being ramped up at the predetermined ramp rate 302 during the ramp phase 300.

Referring back to FIG. 4, at (206), the method 200 may also include monitoring an acceleration of the work vehicle as the on-coming clutch is being engaged. Specifically, as indicated above, the controller 44 may be communicatively coupled to one or more accelerometers 31 included on and/or within the work vehicle 10. As such, the controller 44 may be configured to monitor the acceleration of the vehicle 10 based on the measurement signals provided by the accelerometer(s) 31.

Moreover, at (208), the method 200 may include determining a current travel direction for the work vehicle based on the monitored acceleration. Specifically, in several embodiments, the controller 44 may be configured to compare two or more of the measurement signals provided by the accelerometer(s) 31 over time to determine the current travel direction of the work vehicle 10. For example, in one embodiment, the controller 44 may be configured to compare a measurement signal(s) provided by the accelerometer(s) 31 prior to initiating the shifting procedure (e.g., when the work vehicle 10 is still in its parked condition) to a measurement signal(s) provided by the accelerometer(s) 31 following the initiation of the shifting procedure (e.g., while the on-coming clutch is being engaged). Based on such a comparison, the controller 44 may determine the vehicle's current travel direction.

Further, at (210), the method may include adjusting an initial ramp rate for engaging the on-coming clutch to an increased ramp rate when it is determined that the current travel direction differs from the intended driving direction. Specifically, as indicated above, when the work vehicle 10 is parked on a sloped surface 25 and the transmission 24 is being shifted such that the vehicle 10 moves in a direction up the sloped surface 25, the work vehicle 10 may initially roll in the opposite direction down the slope due to the delay in engaging the on-coming clutch. Thus, when such unintended motion is detected, the controller 44 may be configured to increase the ramp rate at which the on-coming clutch is being engaged in an attempt to prevent or minimize further motion of the work vehicle 10 down the slope. For instance, as shown in FIG. 5, upon the detection of unintended motion (e.g., at time ($t_0$) indicated by line 306), the controller 44 may be configured to increase the ramp rate of the on-coming clutch (as indicated by line 310) to reduce the amount of time that is required to engage the clutch. Specifically, as shown, due to the increased ramp rate, the clutch pressure may be increased to its engagement pressure significantly faster (e.g., at time ($t_1$) indicated by line 312 as opposed to at time ($t_2$) indicated by line 314). As indicated above, the controller 44 may be configured to increase the ramp rate of the on-coming clutch by adjusting the current command being supplied to a suitable valve (e.g., the proportional solenoid pressure reducing valve 84 shown in FIG. 3), which, in turn, controls the fluid pressure of the hydraulic fluid being supplied to a clutch actuator (e.g., actuator 62 shown in FIG. 3) that engages the on-coming clutch.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling the operation of a transmission of a work vehicle based on the detection of unintended vehicle motion, the method comprising:
   determining an intended driving direction for the work vehicle while the work vehicle is positioned on a sloped surface;
   initiating a shifting procedure within the transmission for engaging an on-coming clutch associated with moving the work vehicle in the intended driving direction, the on-coming clutch being initially engaged at an initial ramp rate;
   monitoring an acceleration of the work vehicle as the on-coming clutch is being engaged using an accelerometer positioned on or within the work vehicle;
   comparing a first accelerometer measurement obtained prior to the initiation of the shifting procedure to a second accelerometer measurement obtained following the initiation of the shifting procedure to determine a current travel direction for the work vehicle; and
   when the current travel direction differs from the intended driving direction, adjusting the initial ramp rate for engaging the on-coming clutch to an increased ramp rate.

2. The method of claim 1, wherein adjusting the initial ramp rate for engaging the on-coming clutch to the increased ramp rate comprises increasing a fluid pressure of hydraulic fluid being supplied to a clutch actuator associated with the on-coming clutch.

3. The method of claim 1, wherein the on-coming clutch is associated with moving the work vehicle in a forward direction, wherein determining the current travel direction for the work vehicle comprises determining that the work vehicle is traveling in a reverse direction down the sloped surface based on the monitored acceleration.

4. The method of claim 1, wherein the on-coming clutch is associated with moving the work vehicle in a reverse direction, wherein determining the current travel direction for the work vehicle comprises determining that the work vehicle is traveling in a forward direction down the sloped surface based on the monitored acceleration.

5. The method of claim 1, wherein determining the intended driving direction for the work vehicle comprises receiving an operator input associated with the intended driving direction for the work vehicle.

6. The method of claim 1, wherein the work vehicle is in a parked condition on the sloped surface prior to the initiation of the shifting procedure.

7. A system for controlling the operation of a transmission of a work vehicle based on the detection of unintended vehicle motion when the work vehicle is initially parked on a sloped surface, the system comprising:
   an accelerometer located on or within the work vehicle; and
   a controller communicatively coupled to the accelerometer, the controller including a processor and associated memory, the memory storing instructions that, when implemented by the processor, configure the controller to:
      determine an intended driving direction for the work vehicle;
      initiate a shifting procedure within the transmission for engaging an on-coming clutch associated with moving the work vehicle in the intended driving direction, the on-coming clutch being initially engaged at an initial ramp rate;
      monitor an acceleration of the work vehicle as the on-coming clutch is being engaged based on sensor measurements received from the accelerometer;
      compare a first accelerometer measurement obtained prior to the initiation of the shifting procedure to a second accelerometer measurement obtained following the initiation of the shifting procedure to determine a current travel direction for the work vehicle; and
   when the current travel direction differs from the intended driving direction, adjust the initial ramp rate for engaging the on-coming clutch to an increased ramp rate.

8. The system of claim 7, wherein the controller is configured to adjust the initial ramp rate by increasing a fluid pressure of hydraulic fluid being supplied to a clutch actuator associated with the on-coming clutch.

9. The system of claim 7, wherein the on-coming clutch is associated with moving the work vehicle in a forward direction, wherein the controller is configured to adjust the initial ramp rate when the controller determines that the work vehicle is traveling in a reverse direction down the sloped surface based on the monitored acceleration.

10. The system of claim 7, wherein the on-coming clutch is associated with moving the work vehicle in a reverse direction, wherein the controller is configured to adjust the initial ramp rate when the controller determines that the work vehicle is traveling in a forward direction down the sloped surface based on the monitored acceleration.

11. The system of claim 7, wherein the controller is configured to determine the intended driving direction for the work vehicle based on an operator input received via an input device communicatively coupled to the controller.

12. A work vehicle, comprising:
   a chassis;
   an engine supported on the chassis;
   a transmission coupled to the engine; and
   a controller communicatively coupled to the transmission, the controller including a processor and associated memory, the memory storing instructions that, when implemented by the processor, configure the controller to:
      determine an intended driving direction for the work vehicle;
      initiate a shifting procedure within the transmission for engaging an on-coming clutch associated with moving the work vehicle in the intended driving direction, the on-coming clutch being initially engaged at an initial ramp rate;
      monitor an acceleration of the work vehicle as the on-coming clutch is being engaged;
      compare a first accelerometer measurement obtained prior to the initiation of the shifting procedure to a second accelerometer measurement obtained following the initiation of the shifting procedure to determine a current travel direction for the work vehicle; and
      when the current travel direction differs from the intended driving direction, adjust the initial ramp rate for engaging the on-coming clutch to an increased ramp rate; and
   an accelerometer mounted on or within the work vehicle, the accelerometer being communicatively coupled to the controller.

13. The work vehicle of claim 12, wherein the controller is configured to adjust the initial ramp rate by increasing a fluid pressure of hydraulic fluid being supplied to a clutch actuator associated with the on-coming clutch.

14. The work vehicle of claim 12, wherein the on-coming clutch is associated with moving the work vehicle in a forward direction, wherein the controller is configured to adjust the initial ramp rate when the controller determines that the work vehicle is traveling in a reverse direction down the sloped surface based on the monitored acceleration.

15. The work vehicle of claim 12, wherein the on-coming clutch is associated with moving the work vehicle in a reverse direction, wherein the controller is configured to adjust the initial ramp rate when the controller determines that the work vehicle is traveling in a forward direction down the sloped surface based on the monitored acceleration.

\* \* \* \* \*